United States Patent
Ermilios et al.

(10) Patent No.: US 10,567,704 B2
(45) Date of Patent: Feb. 18, 2020

(54) METHOD FOR MOTION ESTIMATION BETWEEN TWO IMAGES OF AN ENVIRONMENTAL REGION OF A MOTOR VEHICLE, COMPUTING DEVICE, DRIVER ASSISTANCE SYSTEM AS WELL AS MOTOR VEHICLE

(71) Applicant: Connaught Electronics Ltd., Tuam, County Galway (IE)

(72) Inventors: Pantelis Ermilios, Tuam (IE); Bryan Mcnamara, Tuam (IE); William O'Grady, Tuam (IE); Myles Friel, Tuam (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 0 days.

(21) Appl. No.: 16/084,512

(22) PCT Filed: Mar. 10, 2017

(86) PCT No.: PCT/EP2017/055715
§ 371 (c)(1),
(2) Date: Sep. 12, 2018

(87) PCT Pub. No.: WO2017/157799
PCT Pub. Date: Sep. 21, 2017

(65) Prior Publication Data
US 2019/0104278 A1    Apr. 4, 2019

(30) Foreign Application Priority Data

Mar. 15, 2016    (DE) .................. 10 2016 104 732

(51) Int. Cl.
*G06T 7/80*    (2017.01)
*G06T 7/223*    (2017.01)
(Continued)

(52) U.S. Cl.
CPC ............. *H04N 7/014* (2013.01); *G06T 7/231* (2017.01); *H04N 5/145* (2013.01);
(Continued)

(58) Field of Classification Search
CPC .......... G06T 7/80; G06T 7/231; G06T 7/223; H04N 5/145
See application file for complete search history.

(56) References Cited

U.S. PATENT DOCUMENTS 5,485,224 A * 1/1996 Burns .................... H04N 5/145
                                                     348/699
2014/0071286 A1* 3/2014 Bernal ..................... G06T 7/20
                                                     348/149

FOREIGN PATENT DOCUMENTS

DE    10 2008 014 790 A1    10/2009
DE    10 2014 019078 A1     6/2015

OTHER PUBLICATIONS

International Search Report issued in PCT/EP2017/055715 dated May 18, 2017 (2 pages).
(Continued)

*Primary Examiner* — Thai Q Tran
*Assistant Examiner* — Jose M Mesa
(74) *Attorney, Agent, or Firm* — Osha Liang LLP

(57) ABSTRACT

The invention relates to a method for motion estimation between two images of an environmental region (9) of a motor vehicle (1) captured by a camera (4) of the motor vehicle (1), wherein the following steps are performed: a) determining at least two image areas of a first image as at least two first blocks (B) in the first image, b) for each first block (B), defining a respective search region in a second image for searching the respective search region in the second image for a second block (B) corresponding to the respective first block (B); c) determining a cost surface (18) for each first blocks (B) and its respective search region; d)

(Continued)

Figure 1:
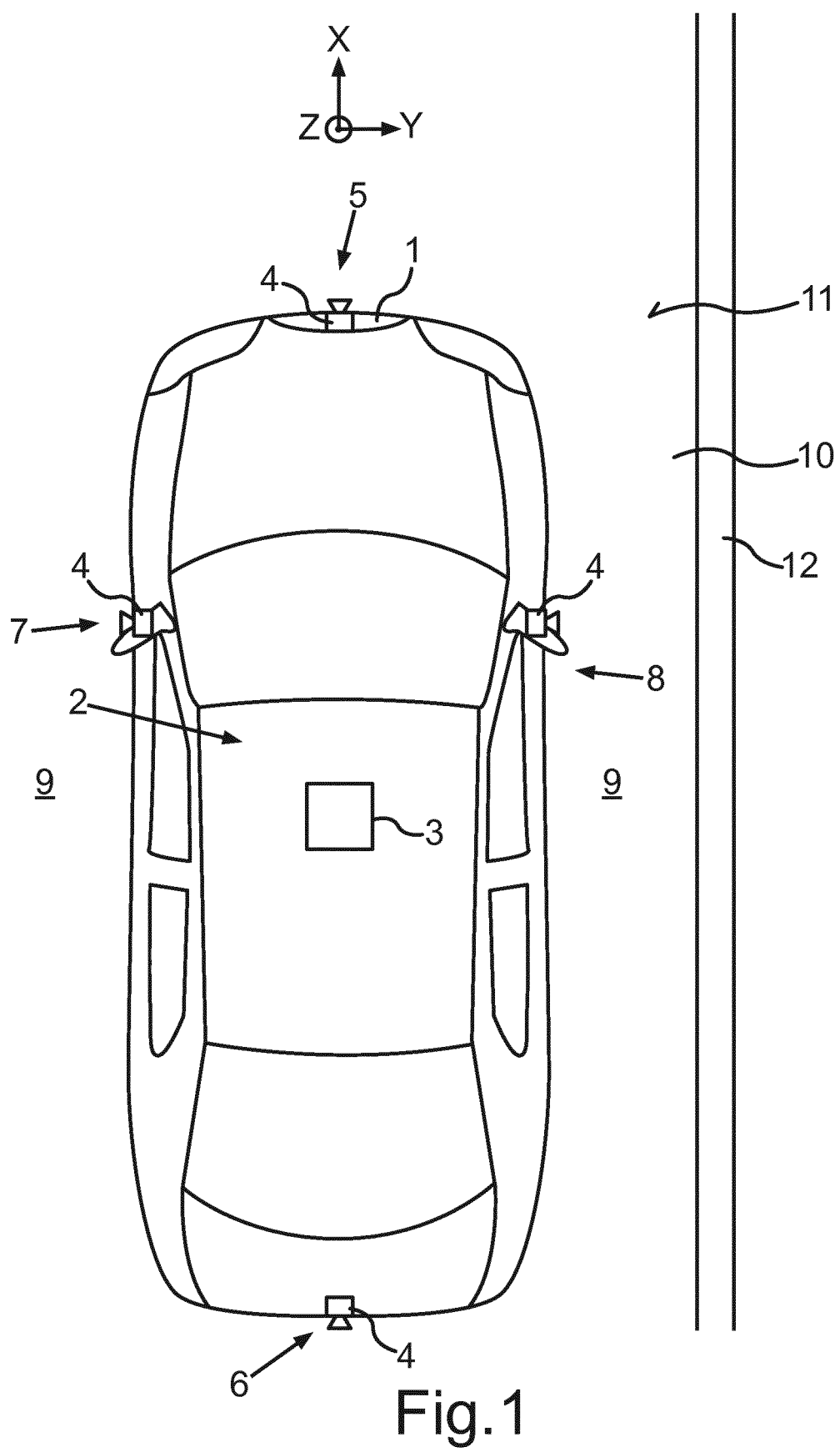

determining an averaged cost surface (19) for one of the at least two first blocks (B) based on the cost surfaces (18); d) identifying a motion vector (v) for the one of the first blocks (B) describing a motion of a location of the first block (B) in the first image and the corresponding second block (B) in the second image. The invention also relates to a computing device (3), a driver assistance system (2) as well as a motor vehicle (1).

14 Claims, 5 Drawing Sheets

(51) Int. Cl.
*G06T 7/231* (2017.01)
*H04N 7/01* (2006.01)
*H04N 5/14* (2006.01)
*B60R 1/12* (2006.01)

(52) U.S. Cl.
CPC . *B60R 2001/1253* (2013.01); *B60R 2300/101* (2013.01); *B60R 2300/102* (2013.01); *B60R 2300/105* (2013.01); *B60R 2300/303* (2013.01); *B60R 2300/802* (2013.01)

(56) References Cited

OTHER PUBLICATIONS

Written Opinion of the International Searching Authority issued in PCT/EP2017/055715 dated May 18, 2017 (6 pages).
German Search Report issued in DE 10 2016 104 732.5 dated Nov. 10, 2016 (6 pages).

\* cited by examiner

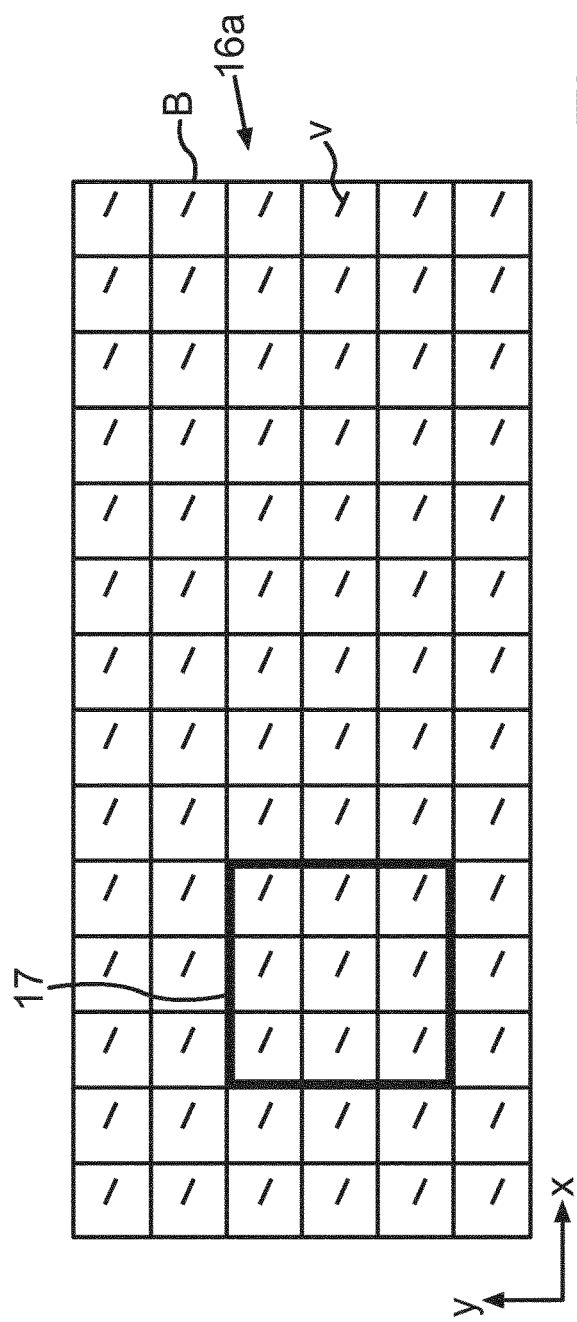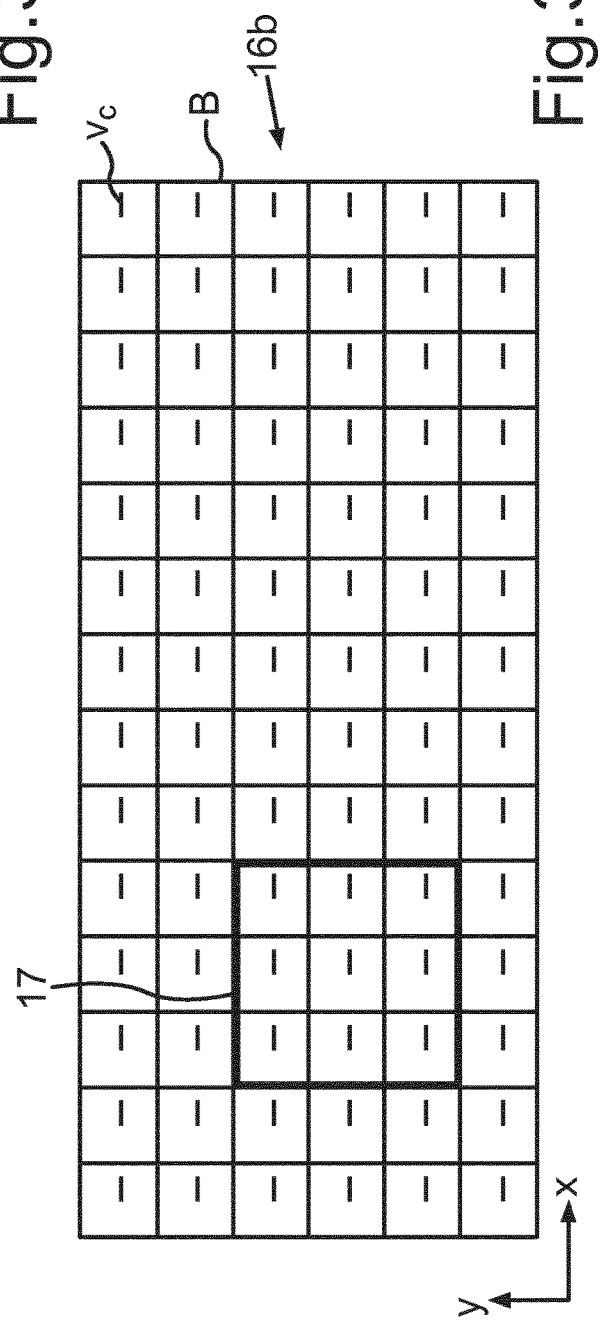

METHOD FOR MOTION ESTIMATION BETWEEN TWO IMAGES OF AN ENVIRONMENTAL REGION OF A MOTOR VEHICLE, COMPUTING DEVICE, DRIVER ASSISTANCE SYSTEM AS WELL AS MOTOR VEHICLE

The invention relates to a method for motion estimation between two images of an environmental region of a motor vehicle captured by a camera of the motor vehicle. In addition, the invention relates to a computing device, to a driver assistance system as well as to a motor vehicle with a driver assistance system.

Presently, the interest focuses on cameras for motor vehicles. The cameras are adapted to capture an environmental region of the motor vehicle in images or rather video frames. Information extracted from the images can be provided to a driver assistance system of the motor vehicle. For purpose of motion estimation between two video frames, it is known from the prior art to use block matching algorithms in order to locate matching or corresponding blocks, so-called macroblocks, in a sequence of the video frames. Corresponding blocks is understood to be image areas of two image frames which at least partially display the same environmental region. The block matching algorithm usually involves dividing the current frame of a video into macroblocks and comparing each of the macroblocks with a corresponding block and its adjacent neighbours in a nearby frame of the videos, in particular the previous one. A motion vector is created that models the movement of a macroblock from one location to another. This movement, calculated for all the macroblocks comprising a frame, constitutes the motion estimated in a frame. In difficult environmental conditions such as low-light or adverse weather the video frames can be corrupted by high-level of noise, motion blur and other artefacts that generally degrade the block matching quality and thus the accuracy or validity of the extracted motion vectors leading into a large number of outliers. Thus, block matching techniques known from prior art may struggle or fail to produce usable motion vectors.

It is the object of the present invention to provide a solution how motion estimation between images captured by a vehicle-side camera can be performed in a reliable manner, in particular despite adverse environmental conditions.

According to the invention, this object is solved by a method, a computing device, a driver assistance system as well as a motor vehicle comprising the features according to the respective independent claims. Advantageous embodiments of the invention are the subject matter of the dependent claims, of the description, and of the figures.

In an embodiment of the invention a method is provided which serves for motion estimation between two images of an environmental region of a motor vehicle captured by a camera of the motor vehicle. In particular, at least two image areas of a first image are determined as at least two first blocks in the first image, and for each first block a respective search region is defined in a second image for searching the respective search region in the second image for a second block corresponding to the respective first block. Then, a cost surface for each first blocks and its respective search region can be determined and an averaged cost surface for one of the at least two first blocks based on the cost surfaces can be determined. Moreover, a motion vector for the one of the first blocks relating to the average cost surface can be determined which describes a motion of a location of the first block in the first image and the corresponding second block in the second image.

In a preferred embodiment of the invention a method is provided which serves for motion estimation between two images of an environmental region of a motor vehicle captured by a camera of the motor vehicle. For this, at least two image areas of a first image are determined as at least two first blocks in the first image, and for each first block a respective search region is defined in a second image for searching the respective search region in the second image for a second block corresponding to the respective first block. Then, a cost surface for each first blocks and its respective search region is determined and an averaged cost surface for one of the at least two first blocks based on the cost surfaces is determined. Moreover, a motion vector for the one of the first blocks relating to the average cost surface is determined which describes a motion of a location of the first block in the first image and the corresponding second block in the second image.

By means of the method a block matching operation can be performed, e.g. by a vehicle-side computing device, in particular even in adverse environmental conditions. The block matching operation is performed based on the two images or video frames captured by the vehicle-side camera. The vehicle can comprise four cameras that can form a surround view camera system, wherein a first camera can be disposed in a front area of the motor vehicle, a second camera can be disposed in a rear area of the motor vehicle, a third camera can be disposed on a driver's side of the motor vehicle, in particular on a driver's side wing mirror, and a fourth camera can be disposed on a passenger's side of the motor vehicle, in particular on a passenger's side wing mirror. The cameras can comprise fisheye lenses in order to enlarge an angle of view and thus a detection range of the cameras.

The images can be separated into blocks or macroblocks which can be adjacent or overlapping and their shape can be rectangular, circular or anything else. Preferably, adjacent rectangular blocks are arranged on a regular grid. In case of a camera having a fish eye lens the fisheye distorted images can be transferred into a virtual plan view in order to remove the fisheye distortion. Individual cost surfaces for each block in the block grid are determined, where the first blocks are obtained from their fixed locations on the block-grid in one frame, or rather the first image, and matched within their respective search regions in the other frame, or rather the second image. The size and position of the search regions can be fixed or dynamically assigned by predicting the camera ego-motion between the two frames e.g. from the vehicle odometry. The odometry is the use of data from motion sensors of the motor vehicle, e.g. wheel rotation, steering angle, etc., to estimate a vehicle's change in position over time. This can be derived by positioning a first block as reference block from one frame at all possible locations within a search region or search window of another frame. The purpose of this step is to find the corresponding second block for each first blocks, wherein the second block at least partially displays the same environmental subarea as the corresponding first block. In particular, the first block has a smaller size, e.g. 32×32 pixels, than the search region, e.g. 64×64 pixels. Then, the Sum of the Squared Differences (SSD) between the pixels of the reference block and the respective pixels in the search window can be taken. The shape of the individual cost surfaces can be inherently irregular.

The averaged cost surface for one of the blocks is determined based on the individual cost surfaces determined for the at least two first blocks and their corresponding search regions. From this averaged cost surface having less fluctuation than the individual cost surfaces the motion vector can be derived. The motion vector or displacement vector describes the displacement of the two corresponding blocks between two images.

The invention is based on the knowledge that motion vectors directly derived from the individual cost surfaces would be identified as outliers, in particular in case of adverse environmental conditions, like low-light or adverse weather, since the shape of the individual cost surfaces is inherently irregular. In contrast, using the method according to the invention motion vectors for block matching operations can be determined reliably even in adverse environmental conditions.

Particularly preferably, a global minimum of the averaged cost surface is determined and the motion vector is determined in dependency on the global minimum. Since the individual cost surfaces can be inherently irregular, global minima can hardly be identified or even be at the wrong location. A motion vector extracted from that global minimum location would be consequently erroneous. Since the averaged cost surface has less fluctuation the global minimum is clearly visible as a strong negative peak. Thus, the global minimum of the averaged cost surface is easy to identify. Based on the global minimum of the averaged cost surface the motion vector, in particular the coordinates of the motion vector, can be determined.

Preferably, for determining the average cost surface, a mean value of each cost surface is determined, and respective weighting factors for determining the averaged cost surface are determined based on the mean values. In particular, the weighting factors are determined as a reciprocal of the respective mean value. In other words the averaged cost surface is determined as a weighted average of the individual cost surfaces. The weights can be chosen so as to approximately equalise the energy of the individual cost surfaces.

In a further embodiment of the invention, a sliding window is determined comprising a predetermined number of first blocks, wherein the motion vector is determined for one of the first blocks within the sliding window based on the cost surfaces of all first blocks within the sliding window. In particular, the number of first blocks within the sliding window is preset such that one first block is completely surrounded by further first blocks within the sliding window, wherein the motion vector is determined for the first block in the middle surrounded by the further first blocks. For instance, using a sliding window having 3×3 first blocks the cost surfaces from a group of neighbouring first blocks in the block-grid enclosed by the sliding window can be selected. The weighted average of their cost values can be determined to obtain a new cost surface where each value is the weighted average of the respective values of the individual cost surfaces. The resulting new cost surface is the averaged cost surface, in particular the cost surface corresponding to the block in the centre of the sliding window. Then, the motion vector that would normally correspond to the central block of the sliding window is determined. The sliding window can be moved to the next location and the process can be repeated until all locations within the block-grid have been exhausted.

In an advantageous development of the invention, an extrinsic calibration of the camera is performed based on the motion vector derived from the averaged cost surface. In this embodiment a method for extrinsic calibration of the camera is provided. The extrinsic calibration method or motion tracking calibration (MTC) operation serves for online calibration of the vehicle-side camera by analysing a sequence of at least two images captured by the camera while the vehicle is moving particularly in an approximately straight path. In other words the purpose is to determine and calibrate at least one extrinsic parameter of the camera during movement of the motor vehicle by means of the time sequence comprising at least one pair of images. For example, the extrinsic parameters can comprise a spatial orientation of the camera relative to the road surface or ground plane and a height of the camera relative to the ground or relative to another camera of the vehicle. The method can be performed by the computing device which can also be adapted to individually calibrate each camera of the vehicle.

The images at least partially show the road surface or ground surface in a vicinity of the motor vehicle as well as a texture being present on the surface such as tarmac. In particular, the calibration operation according to this embodiment does not require any particular features of interest such as corners, contours, edges or lines to be present on the image. In particular, at least one calibration cycle is performed resulting in a single calibration result.

Preferably, for performing the extrinsic calibration, a rotation calibration of the camera is performed, wherein a loss function describing a deviation between the motion vector and a predetermined vector is determined and a rotation-compensated motion vector is determined by minimizing the loss function. In other words this means that the rotation calibration is performed by finding the 3-DOF (degree of freedom) spatial orientation of the camera relative to the ground plane or road surface by analysing the motion vector. The orientation of the camera is a first extrinsic parameter to be calibrated. The orientation of the camera can deviate from an default predetermined orientation due to mechanical tolerances in the vehicle manufacturing process. The orientation can for example be expressed in a roll-pitch-yaw rotation scheme rotating in sequence about the fixed X-, Y- and Z-axes of the world coordinate system, wherein the X-axis is orientated along a longitudinal vehicle axis, the Y-axis is orientated along a transverse vehicle axis and the Z-axis is orientated along a vertical vehicle axis.

Then, the loss function or cost function to be minimised is formulated that particularly exploits geometric properties of the motion vectors on the road surface or ground plane and, in particular, the constraint for approximately straight driving of the motor vehicle. The sum of squared errors or sum of absolute errors from the mean or median can be minimised with the help of an iterative algorithm, such as gradient descent, Gauss-Newton, Levenberg-Marquardt or others, wherein those iterative, non-linear method gives a great flexibility on how the loss function can be formulated to tweak the solution. It is also possible to state the problem as an over-determined system of linear equations and solve in a least-squares sense with various methods. The invention is based on the fact that a calibrated system should produce motion vectors free from perspective distortion and of equal length, in particular while driving straight on a flat ground. For instance, motion vectors free from perspective distortion are motion vectors that are all parallel to the horizontal x-axis (in the image frame), or parallel to the longitudinal vehicle axis in case of the motion vector projected onto the ground surface. Thus, the predetermined vector is the distortion-free vector parallel to the horizontal or longitudinal axis. This objective can be expressed by the sum of squares of the y-components and the variance of the x-components of all motion vectors. For a calibrated camera in ideal conditions this would be zero. Therefore, the loss function indicates the difference between the present, real condition and the ideal condition. Thus, by finding the loss function, a present camera orientation deviating from the default camera orientation can easily be determined as the first extrinsic parameter of the camera. By minimizing the loss function, a rotation-compensated motion vector can be derived. The rotation-compensated motion vectors relating to a plurality of corresponding blocks within the images can be re-projected on the plane of the road surface or ground plane 11, wherein the re-projected, calibrated motion vectors particularly are orientated parallel to the longitudinal vehicle axis and have also equal length.

In a further development, for calibrating the camera, a height calibration of the camera is performed, wherein the height of the camera is determined in dependency on a length of the rotation-compensated motion vector and an expected value of the length of the rotation-compensated motion vector. The height of the camera is a second extrinsic parameter to be calibrated. The height of the camera can deviate from the nominal default due to airmatic suspension or due to loading changes in the motor vehicle such as the number of passengers or weight in a vehicle's boot.

The height is determined by analysing the rotation-compensated motion vector which is derived from the minimisation of the loss function. This means that a height calibration is performed to find the absolute height of each camera from the ground surface or the relative height between the cameras by analysing the rotation-compensated, calibrated and re-projected motion vectors from the previous step.

The length of the corrected, rotation-calibrated and re-projected motion vector of the camera is proportional to the velocity or speed of the vehicle and inversely proportional to the height of the camera from the ground plane. Therefore, the expected value for the length is advantageously preset in dependency on the velocity of the vehicle. In particular, the velocity of the motor vehicle is determined by means of odometry of the motor vehicle and/or based on at least one further motion vector, which is determined based on images captured by at least one further camera of the motor vehicle. This latter means that motion vectors from more than one camera can be considered. Therefore, the height of the camera can be determined by adjusting the value of the height of each camera such that the re-projected motion vectors have equal length in all cameras. For this purpose it proves advantageous, if a mean length of the motion vectors of the mirror left and mirror right cameras are taken as a reference and the value of the height of the other cameras is adjusted to match it, since the mirror cameras are affected the least by loading changes of the motor-vehicle. In summary, MTC adjusts the calibration so that the projected motion vectors on the ground plane are parallel to the longitudinal vehicle axis and have also equal length.

The invention additionally relates to a computing device for a driver assistance system of a motor vehicle, which is adapted to perform a method according to the invention. The computing device which can be formed by a vehicle-side control unit is adapted to perform a block matching procedure even at bad environmental conditions. In addition, the computing device can be adapted to calibrate each camera of the motor vehicle individually based on the results of the block matching procedure.

Moreover, the invention additionally relates to a driver assistance system for a motor vehicle comprising at least one camera and a computing device according to the invention. The driver assistance system supports a driver of the vehicle by means of the cameras monitoring the environmental region of the vehicle. The driver assistance system can comprise four cameras forming a surround view camera system. The cameras can also comprise fisheye lenses enlarging a detection area of the cameras. The driver assistance system may reliably detect objects in the images captured by the calibrated cameras and thus, may support the driver of the vehicle, for instance by producing a warning signal or automatically braking the motor vehicle when detecting an imminent collision of the motor vehicle with the detected object. In addition, the images captured by the calibrated camera can be displayed, in particular as a video, on a vehicle-side display device. In other words, the camera can be configured as a video camera.

A motor vehicle according to the invention includes a driver assistance system according to the invention. The motor vehicle is in particular configured as a passenger car.

The preferred embodiments presented with respect to the method according to the invention and the advantages thereof correspondingly apply to the computing device, to the driver assistance system according to the invention as well as to the motor vehicle according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are also to be considered as disclosed, in particular by the explanations set out above, which extend beyond or deviate from the feature combinations set out in the relations of the claims.

Now, the invention is explained in more detail based on preferred embodiments as well as with reference to the attached drawings.

Figure 2:
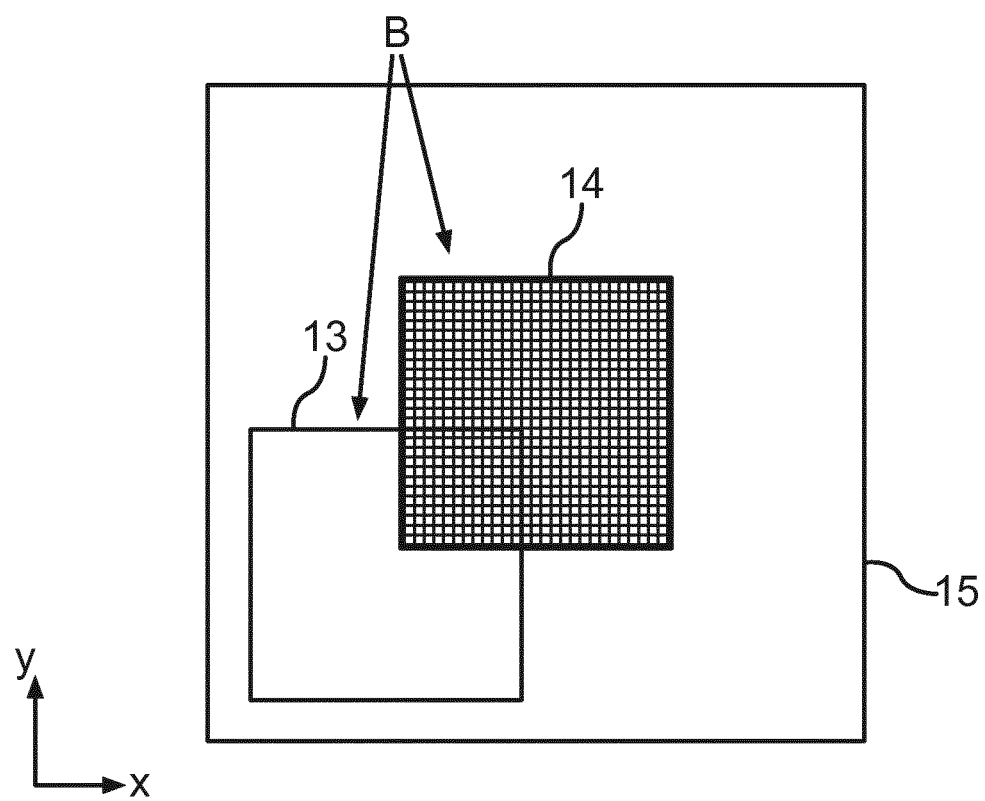
Figure 4:
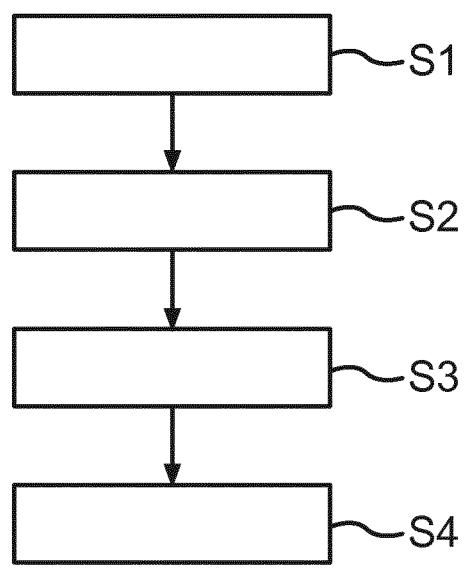
Figure 5:
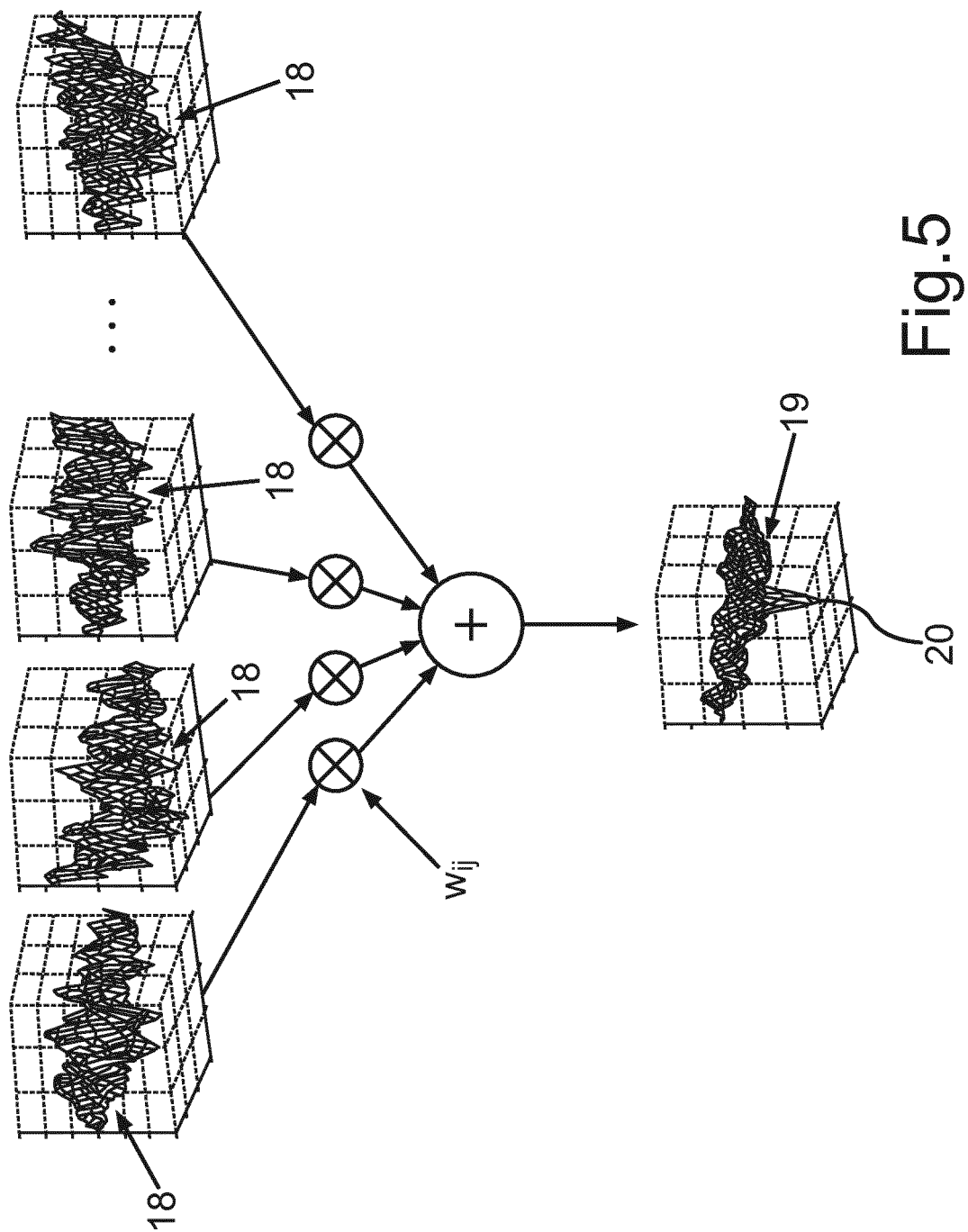

These show in:

FIG. 1 a schematic representation of an embodiment of a motor vehicle according to the invention;

FIG. 2 a schematic representation of a block matching operation;

FIG. 3a, 3b a schematic view of a motion field divided into blocks as well as a schematic view of motion vectors;

FIG. 4 a schematic representation of a flow chart of an embodiment of a method according to the invention; and FIG. 5 a schematic view of cost surfaces as well as an averaged cost surface.

In the figures, identical as well as functionally identical elements are provided with the same reference characters.

FIG. 1 shows a motor vehicle 1 according to the present invention. In the present case, the motor vehicle 1 is configured as a passenger car. The motor vehicle 1 has a driver assistance system 2 for supporting a driver of the motor vehicle 1. The driver assistance system 2 comprises a computing device 3, which can for example be formed by a vehicle-side control unit. Additionally, the driver assistance system 2 comprises at least one camera 4. In the present case, the driver assistance system 2 includes four cameras 4, wherein a first camera 4 is disposed in a front area 5 of the motor vehicle 1, a second camera 4 is disposed in a rear area 6 of the motor vehicle 1, a third camera 4 is disposed on a driver's side 7 of the motor vehicle 1, in particular on a wing mirror of the driver's side 7, and a fourth camera 4 is disposed on a passenger side 8 of the motor vehicle 1, in particular on a wing mirror of the passenger's side 8. The cameras 4 disposed on the driver's side 7 and the passenger's side 8 can also replace the wing mirrors, whereby the motor vehicle 1 can be designed as a mirrorless vehicle 1 enabling mirrorless driving. By means of the cameras 4, an environmental region 9 of the motor vehicle 1 can be captured in images. The cameras 4 can comprise fisheye lenses in order to enlarge an angle of view and thus a detection range of the cameras 4.

The computing device 3 is adapted to perform a block matching operation based on the images or rather video frames captured by the at least one camera 4 by means of tracking a texture, such as tarmac, of a road surface 11 of a road 10 for the motor vehicle 1. In particular, the computing device 3 is adapted to improve the accuracy of the road surface texture tracking in the block matching algorithm when operating in difficult environmental conditions, such as low-light or adverse weather. In such conditions, the images or video frames can be corrupted by high-level of noise, motion blur and other artefacts that generally degrade the block matching quality.

The block matching algorithm is a method of locating matching blocks B (see FIG. 2) of image data in a sequence of images or digital video frames for the purposes of motion estimation or optical flow. FIG. 2 visualizes a block matching operation known from the prior art. Therefore, the current video frame is divided into blocks B also referred to as macroblocks, wherein each macroblock is particularly compared for its similarity with all possible blocks of the same size within a specified search window 15 in another frame. In FIG. 2, the block 14 is a macroblock B with a size N×N in the current video frame and the block 13 is a macroblock B under search with a size N×N in the previous frame within a search window 15. The location that gives the highest similarity between the two blocks 13, 14, the so-called minimum cost location, can be selected and registered as a motion vector, i.e. a 2-dimension vector where the two components x, y correspond to the horizontal and vertical relative displacement of the block 13, 14 between the two frames.

The similarity measure, also referred to as a block-distortion measure or matching cost, can be obtained by various methods such as Cross Correlation, Normalised Cross Correlation, Phase Correlation, Sum of Absolute Differences (SAD), Sum of Squared Differences (SSD), Sum of Absolute Transformed Differences (SATD), Census/Hamming distance and many more. SAD and SSD are popular because of their computational efficiency and sufficiently good quality for many applications. The lower the matching cost is at a particular location the higher the similarity between the compared blocks 13, 14 is at that location. For example a perfect or ideal match would result in zero cost when the sum of absolute or squared differences of the overlapping pixels of the two blocks 13, 14 is taken. Radiometric invariance can be achieved by pre-filtering the images with a Laplacian of Gaussian, Difference of Gaussians or other filters.

The matching cost between the reference block 14 and a candidate block 13 at each test location can be computed by means of exhaustive search for all possible locations within the nominated search window 15. This method which is also referred to as full search (FS) yields the most accurate results and lowest number of outliers or erroneous motion vectors but is also the most computationally expensive. Various methods are known that seek to reduce the amount of computation by avoiding computing the matching cost at all possible locations at the expense of degrading the quality of the results. These include Diamond Search (DS), Hexagon-based Search (HEXBS), Adaptive Rood Pattern Search (ARPS) and many more. A notable exception is a simple computational optimisation of the full-search method known as Fast Computation of Full Search (FCFS) that does not impact quality.

With those techniques each reference block 14 can be matched independently within its nominated search window 15. The proposed technique can combine information from neighbouring blocks in a unique way, in particular under the assumption that all blocks B represent a uniform motion locally on the same plane, leading to strong matches.

For example, a motion field 16a, 16b on the ground surface 11 obtained by block matching two successive frames while the vehicle 1 is travelling straight is shown in FIG. 3a and FIG. 3b. In case of cameras 4 having fisheye lenses, the frames have been previously rectified into virtual-plan views, in particular for the purpose of an extrinsic calibration algorithm for the camera 4. FIG. 3a shows the motion field 16a of an uncalibrated camera 4 which exhibits perspective distortion as the virtual plan-view has been generated using incorrect extrinsic calibration parameters. A calibrated system should produce motion vectors on the virtual plan view free from perspective distortion, i.e. parallel to the horizontal x-axis and of equal length. The motion vectors v shown in FIG. 3a are not parallel to the horizontal x-axis and of equal length, and thus, indicate the uncalibrated system.

FIG. 3b has been generated with the correct extrinsic calibration parameters and has no perspective distortion i.e. the ground plane is mapped correctly to a parallel virtual image plane. Thus FIG. 3b shows the motion field 16b of a calibrated camera 4. The calibrated motion vectors $v_c$ are all parallel to the horizontal x-axis and of equal length. The square 17 indicates an arbitrary group of motion vectors v.

The calibrated motion vectors $v_c$ as shown in FIG. 3b can, for instance, be generated by extrinsic calibration, a so-called motion tracking calibration, MTC, wherein the extrinsic rotations and height of the camera 4 are calibrated by analysing the motion field 16a. The MTC operation uses at least two images consecutively captured by the camera 4 and tracks the relative movement of road surface texture such as tarmac between the images or video frames, in particular without the need of strong features, like a kerb 12 alongside the road 10.

In particular, using the calibration algorithm, a spatial orientation of the camera 4 can be found relative to the ground plane 11 by analysing the motion vectors v. The orientation of the cameras 4 can be expressed in the roll-pitch-yaw rotation scheme rotating in sequence about the fixed X, Y and Z axes of the world coordinate system, where X is the longitudinal vehicle axis, Y is the transverse vehicle axis and Z is the vertical vehicle axis as shown in FIG. 1.

A loss function to be minimised is formulated that exploits the geometric properties of the motion vectors v on the ground plane 11, in particular considering the constraint for approximately straight driving of the motor vehicle. By minimizing the cost function the motion vectors v can be mapped and re-projected to rotation-compensated and calibrated motion vectors $v_c$ that are free from perspective distortion and are all parallel to the horizontal x-axis.

In addition, the height of the cameras 4 can be calibrated by finding the absolute height of the camera 4 from the ground surface 11 or the relative height between the cameras 4 by analysing the calibrated and re-projected motion vectors $v_c$. The height of the cameras 4 can deviate from the nominal default due to airmatic suspension or due to loading changes in the motor vehicle 1 such as the number of passengers or weight in a vehicle's boot. The absolute height of a single camera 4 can be estimated based on vehicle odometry or image features of known scale. The length of the corrected, rotation calibrated, and re-projected motion vectors $v_c$ of a single camera 4 is proportional to the velocity or speed of the vehicle 1 and inversely proportional to the height of that camera 4 from the ground plane 11. Given the odometry of the vehicle from the vehicle-side network, e.g. CAN or FlexRay, an expected length of the motion vectors $v_c$ on the ground 11 can be calculated and the height of the camera 4 can be adjusted to match it with the re-projected motion vectors $v_c$.

It is possible to smooth the motion field 16a before using it for calibration by averaging motion vectors v within a sliding window. For example, the central motion vector v within a sliding window 17 can be computed as the average of the nine motion vectors v contained by the window 17. This can be repeated for each possible location of the sliding window 17 in the block grid while storing the output motion vectors v in a separate buffer to avoid recursion. Any small biases introduced by the averaging of motion vectors v under perspective distortion can be neutralised progressively as the virtual-plan view is updated from the calibration result in a feedback loop.

In difficult environmental conditions such as low-light or adverse weather, block matching produces mostly outlier motion vectors v, i.e. motion vectors v at random lengths and directions. Averaging these motion vectors v would not improve the quality of the information used for calibration. Thus, for improving the performance of the autonomous road based calibration algorithm such as MTC, that is tracking the relative movement of road surface texture between two video frames, a method for motion estimation between two images is performed. The method is visualized in FIG. 4 by means of a flow chart.

In particular, the main idea of the method is to take a weighted average of cost surfaces 18 (see FIG. 5) of all the blocks B within the sliding window 17 before extracting the motion vector v referenced to a block B, particularly the central block B, of the sliding window 17. Within the method, the following steps S1, S2, S3, S4 are performed.

In a first step S1, an individual cost surface 18 for each block B in the block grid is computed, where the blocks B are obtained from their fixed locations on the block-grid in one frame and matched within their respective search regions in the other frame. The size and position of the search regions can be fixed or dynamically assigned by predicting the camera ego-motion between the two frames, e.g. from the vehicle odometry. (NB: The search region 15 or search window 15 used for block matching should not be confused with the sliding-window 17 used for selecting the blocks B whose cost surfaces 18 are to be averaged). The individual cost surfaces 18 of blocks B within the sliding window 17 are shown in FIG. 5. For instance, a cost surface 18 can be derived by positioning a 32×32 pixels reference block 14 from one frame at all possible locations within a 64×64 pixels search window 15 of another frame and taking the Sum of the Squared Differences (SSD) between the pixels of the reference block 14 and the respective pixels in the search window 15. As can be seen in FIG. 5 the shape of the cost surfaces 18 are inherently irregular as there is a random level of similarity between the block 12 and the pixels of the search region 15 at every location. The location of highest similarity has the lowest cost, i.e. is at the global minimum of the cost surface 18—the ideal case being zero cost which occurs when all subtracted pixels are identical. In higher levels of image noise these fluctuations become stronger and may even exceed the depth at the location where the best match would be expected and produce a hardly visible global minimum or a global minimum at the wrong location. A motion vector v extracted from that global minimum location would consequently be erroneous.

In a second step S2 the mean value of each cost surface 18 is determined and its reciprocal is stored as a weighting factor $w_{ij}$ (see FIG. 5) to be used in the next step S3. In this next, third step S3, by using a sliding window 17, e.g. with size 3×3 blocks or another size, the cost surfaces 18 are selected from a group of neighbouring blocks B in the block-grid enclosed by the sliding window 17. A weighted average of their cost values is determined so as to obtain a new cost surface 19 where each value is the weighted average of the respective values of the individual cost surfaces 18. The resulting cost surface 19 will have less fluctuations and a stronger, clearly visible minimum 20 formed by the contributions of weaker minima corrupted by noise in the individual cost surfaces 18. The expectation is that this stronger minimum 20 will now be a global minimum so that correct motion vector v can be extracted.

In a fourth step S4, the global minimum location within the averaged cost surface 19 is determined. From that the coordinates of the motion vector v at the centre of the sliding window 17 can be derived, i.e. the motion vector v that would normally correspond to the central block B of the sliding window 17. Then the sliding window 17 can be moved to the next location and repeat the process steps S1 to S4 until all locations within the block-grid have been exhausted.

In summary, the motion vector v of a particular block B is extracted from the minimum cost location of the weighted-average cost surface 19. The weights $w_{ij}$ are chosen so as to approximately equalise the energy of the individual cost surfaces 18. For this purpose the individual cost surfaces 18 are weighted by the reciprocal of their own average value. To avoid breaking symmetry motion vectors v are particularly not computed for blocks B without symmetrical neighbours. This method can be extended to any window size and can be applied also in a hierarchical way such that multiple layers of cost averaging constrain the search area in subordinate layers to further reduce the possibility of outliers. For example, a global motion vector can be computed from the average cost surface 19 of all blocks B on the grid having a single very strong peak representing the average motion vector. This global motion vector can be used to constrain the search in a previous layer or otherwise for obtaining approximate information about the global motion or perspective error in the scene.

The invention claimed is:

1. A method for motion estimation between two images of an environmental region of a motor vehicle captured by a camera of the motor vehicle, the method comprising:
   determining at least two image areas of a first image as at least two first blocks in a block grid in the first image;
   for each first block, defining a respective search region in a second image for searching the respective search region in the second image for a second block corresponding to the respective first block using block matching;
   determining a cost surface for each first blocks and its respective search region;

determining an averaged cost surface for one of the at least two first blocks based on the cost surfaces; and identifying a motion vector for the one of the first blocks describing a motion of a location of the first block in the first image and the corresponding second block in the second image.

2. The method according to claim 1, wherein a global minimum of the averaged cost surface is determined and the motion vector is determined in dependency on the global minimum.

3. The method according to claim 1, wherein for determining the average cost surface, a mean value of each cost surface is determined, and respective weighting factors for determining the averaged cost surface are determined based on the mean values.

4. The method according to claim 3, wherein the weighting factor is determined as a reciprocal of the respective mean value.

5. The method according to claim 1, wherein a sliding window is determined comprising a predetermined number of first blocks, wherein the motion vector is determined for one of the first blocks within the sliding window based on the cost surfaces of all first blocks within the sliding window.

6. The method according to claim 5, wherein the number of first blocks within the sliding window is preset such that one first block is completely surrounded by further first blocks within the sliding window, wherein the motion vector is determined for the first block in the middle surrounded by the further first blocks.

7. The method according to claim 1, wherein an extrinsic calibration of the camera is performed based on the motion vector derived from the averaged cost surface.

8. The method according to claim 7, wherein for performing the extrinsic calibration, a rotation calibration of the camera is performed, wherein a loss function describing a deviation between the motion vector and a predetermined vector is determined and a rotation-compensated motion vector is determined by minimizing the loss function.

9. The method according to claim 8, wherein for performing the extrinsic calibration, a height calibration of the camera is performed, wherein the height of the camera is determined in dependency on a length of the rotation-compensated motion vector and an expected value of the length of the rotation-compensated motion vector.

10. The method according to claim 9, wherein the expected value for the length is preset in dependency on a velocity of the motor vehicle.

11. The method according to claim 10, wherein the velocity of the motor vehicle is determined by means of odometry and/or based on at least one further motion vector determined for at least one further camera.

12. A computing device for a driver assistance system of a motor vehicle, which is adapted to perform a method according to claim 1.

13. A driver assistance system for a motor vehicle comprising at least one camera and a computing device according to claim 12.

14. A motor vehicle with a driver assistance system according to claim 13.

* * * * *